(12) United States Patent
Jakkula et al.

(10) Patent No.: US 11,030,109 B2
(45) Date of Patent: Jun. 8, 2021

(54) MECHANISMS FOR A CONTENTION FREE LOOKUP IN A CACHE WITH CONCURRENT INSERTIONS AND DELETIONS

(71) Applicant: STELLUS TECHNOLOGIES, INC., San Jose, CA (US)

(72) Inventors: Vijaya Jakkula, San Jose, CA (US); Siva Ramineni, Milpitas, CA (US); Venkata Bhanu P. Gollapudi, Pleasanton, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/433,927

(22) Filed: Jun. 6, 2019

(65) Prior Publication Data
US 2020/0387455 A1    Dec. 10, 2020

(51) Int. Cl.
| | |
|---|---|
| *G06F 12/0891* | (2016.01) |
| *G06F 16/907* | (2019.01) |
| *G06F 12/0815* | (2016.01) |
| *G06F 9/52* | (2006.01) |

(52) U.S. Cl.
CPC ........... *G06F 12/0891* (2013.01); *G06F 9/52* (2013.01); *G06F 12/0815* (2013.01); *G06F 16/907* (2019.01)

(58) Field of Classification Search
CPC ....... G06F 12/0891; G06F 16/907; G06F 9/52
USPC ...................................................... 711/118
See application file for complete search history.

(56) References Cited

U.S. PATENT DOCUMENTS

| | | | |
|---|---|---|---|
| 6,961,814 B1 | 11/2005 | Thelin et al. | |
| 8,176,257 B2 | 5/2012 | Wadhawan et al. | |
| 9,384,147 B1 | 7/2016 | Morshed et al. | |
| 10,078,598 B1 | 9/2018 | Wallace et al. | |
| 2002/0087809 A1* | 7/2002 | Arimilli | G06F 12/0831 711/144 |
| 2010/0275209 A1* | 10/2010 | Detlefs | G06F 9/526 718/102 |
| 2011/0197033 A1* | 8/2011 | Wadhawan | G06F 12/0802 711/133 |
| 2018/0341653 A1* | 11/2018 | Teotia | G06F 16/2255 |
| 2018/0357167 A1 | 12/2018 | Salyers et al. | |
| 2019/0102346 A1* | 4/2019 | Wang | G06F 16/906 |

* cited by examiner

*Primary Examiner* — Gautam Sain
(74) *Attorney, Agent, or Firm* — Lewis Roca Rothgerber Christie LLP

(57) ABSTRACT

A method of contention-free lookup including mapping a key of a cache lookup operation to determine an expected location of object data, walking a collision chain by determining whether a cache header signature matches a collision chain signature, when the cache header signature does not match, again walking the collision chain, when the cache header signature matches, determining whether a key in the cache header signature matches the key of the cache lookup operation, when the key does not match, reading a cache entry corresponding to the cache lookup operation, and repopulating the cache entry, when the key matches, acquiring an entry lock, and determining whether the key still matches after acquiring the entry lock, when the key still matches finding the object data in the expected location, and when the key no longer matches, releasing the entry lock, and again walking the collision chain.

19 Claims, 6 Drawing Sheets

MECHANISMS FOR A CONTENTION FREE LOOKUP IN A CACHE WITH CONCURRENT INSERTIONS AND DELETIONS

FIELD

One or more aspects of embodiments of the present disclosure relate generally to memory, and to methods of enabling multiple contention-free lookup operations in a cache while concurrently allowing insertion operations and/or eviction operations.

BACKGROUND

FIG. 1 depicts an object store that is configured to be accessed by multiple I/O threads respectively corresponding to different applications run by respective clients.

Referring to FIG. 1, an object store 110 allows scalability in storing a large number of objects therein. Modern "big data" operations generally use more unstructured data than was used in the past. That is, the content of a data file stored in the object store is increasingly more likely to be unstructured.

To allow for scalability, the object store allows access of an object stored therein by assigning an object ID to the object. Accordingly, an application seeking to access an object (e.g., "Application 1" 121 or "Application 2" 122 shown in FIG. 1) doesn't have to be aware of a specific location of the object that is part of the object store.

To enable operation, a "distributed object store" comprising a network of memory drives generally uses sophisticated metadata to manage different aspects of stored object data. A few of the aspects managed by the metadata may include growth or shrinkage of an object, data location, data management policies corresponding to the object (e.g., whether duplicate copies are warranted), object-versioning corresponding to the immutable nature of object store, tracking of a location of the object data given an object ID, etc. Further, objects may have to be moved around within the object store (e.g., in the event of a partial failure in the distributed system). Accordingly, access to the object generally uses multiple different metadata accesses in an I/O path (e.g., by multiple I/O threads 130) before the appropriate desired object data can be fetched.

Furthermore, due to the nature of metadata, contention for metadata access is generally higher than contention for the data itself. For example, an I/O thread that seeks to access a part of an object (e.g., a subset of the object data of the object) will generally first access the metadata representing the entire object. Accordingly, although applications are able to access a huge number of objects by using object IDs, the object store management (e.g., a cache manager) has increasingly complex duties associated with metadata management. In this way, performance of the distributed object store is gated by characteristics of the metadata access.

The above information disclosed in this Background section is only for enhancement of understanding of the background of the invention and, therefore, it may contain information that does not form the prior art that is already known in this country to a person of ordinary skill in the art.

SUMMARY

Embodiments described herein provide improvements associated with data access of data stored in a cache by multiple I/O threads.

According to one embodiment of the present disclosure, there is provided a method of contention-free lookup by a cache manager of a data cache, the method including mapping, with the cache manager, a key of a cache lookup operation by performing a hash function on the key to determine an expected location in the data cache of object data corresponding to a key, walking, by the cache manager, a collision chain of the expected location by determining, with the cache manager, for up to each node of a plurality of nodes of the collision chain, whether a cache header signature matches a collision chain signature of the collision chain, when the cache header signature does not match the collision chain signature, again walking, with the cache manager, the collision chain, when the cache header signature matches the collision chain signature, determining, with the cache manager, for up to each of the nodes, whether a key in the cache header signature matches the key of the cache lookup operation, when the key in the cache header signature does not match the key of the cache lookup operation in any of the nodes, reading, with the cache manager, a cache entry corresponding to the cache lookup operation from a data storage, and repopulating, by the cache manager, the cache entry into the expected location, when the key in the cache header signature matches the key of the cache lookup operation, acquiring, by the cache manager, an entry lock, and determining, by the cache manager, whether the key in the cache header signature still matches the key of the cache lookup operation after acquiring the entry lock, when the key in the cache header signature still matches the key of the cache lookup operation after acquiring the entry lock, finding, by the cache manager, the object data in the expected location, and when the key in the cache header signature no longer matches the key of the cache lookup operation after acquiring the entry lock, releasing, with the cache manager, the entry lock, and again walking, with the cache manager, the collision chain.

The method may further include returning, by the cache manager, the object data to a caller that requested the cache lookup operation while maintaining the entry lock after finding, by the cache manager, the object data in the expected location.

Mapping the key of the cache lookup operation may include determining, by the cache manager, a hash table ID and a bucket ID of a hash bucket in a hash table in the data cache, the hash bucket corresponding to the expected location.

The cache lookup operation may include a metadata object lookup operation.

The method may further include generating, by the cache manager, the cache header signature, and placing, by the cache manager, the cache header signature into a cache header of the cache entry.

The entry lock may include a shared entry lock or an exclusive entry lock, and corresponds to a mode requested by an IO operation initiated by a caller that requested the cache lookup operation.

The cache header signature may contain information indicating a state of a cache entry and a state of the object data in the cache entry.

According to another embodiment of the present disclosure, there is provided an object store configured to allow contention-free lookup operations by a plurality of threads, the object store including a data cache that is configured to be managed by a cache manager, the cache manager being configured to map a key of a cache lookup operation by performing a hash function on the key to determine an expected location in the data cache of object data corresponding to a key, walk a collision chain of the expected location by determining, with the cache manager, for up to each node of a plurality of nodes of the collision chain, whether a cache header signature matches a collision chain signature of the collision chain, when the cache header signature does not match the collision chain signature, again walk the collision chain, when the cache header signature matches the collision chain signature, determine, for up to each of the nodes, whether a key in the cache header signature matches the key of the cache lookup operation, when the key in the cache header signature does not match the key of the cache lookup operation in any of the nodes, read a cache entry corresponding to the cache lookup operation from a data storage, and repopulate the cache entry into the expected location, when the key in the cache header signature matches the key of the cache lookup operation, acquire an entry lock, and determine whether the key in the cache header signature still matches the key of the cache lookup operation after acquiring the entry lock, when the key in the cache header signature still matches the key of the cache lookup operation after acquiring the entry lock, find the object data in the expected location, and when the key in the cache header signature no longer matches the key of the cache lookup operation after acquiring the entry lock, release the entry lock, and again walk the collision chain.

The cache manager may be further configured to return the object data to a caller that requested the cache lookup operation while maintaining the entry lock after finding the object data in the expected location.

The cache manager may be configured to map the key of the cache lookup operation by determining a hash table ID and a bucket ID of a hash bucket in a hash table in the data cache, the hash bucket corresponding to the expected location.

The cache lookup operation may include a metadata object lookup operation.

The cache manager may be further configured to generate the cache header signature, and place the cache header signature into a cache header of the cache entry.

The entry lock may include a shared entry lock or an exclusive entry lock, and corresponds to a mode requested by an IO operation initiated by a caller that requested the cache lookup operation.

The cache header signature may contain information indicating a state of a cache entry and a state of the object data in the cache entry.

According to yet another embodiment of the present disclosure, there is provided a non-transitory computer readable medium implemented on a distributed object store system, the non-transitory computer readable medium having computer code that, when executed on a processor, implements a method of contention-free lookup by a cache manager of a data cache of the distributed object store system, the method including mapping, with the cache manager, a key of a cache lookup operation by performing a hash function on the key to determine an expected location in the data cache of object data corresponding to a key, walking, by the cache manager, a collision chain of the expected location by determining, with the cache manager, for up to each node of a plurality of nodes of the collision chain, whether a cache header signature matches a collision chain signature of the collision chain, when the cache header signature does not match the collision chain signature, again walking, with the cache manager, the collision chain, when the cache header signature matches the collision chain signature, determining, with the cache manager, for up to each of the nodes, whether a key in the cache header signature matches the key of the cache lookup operation, when the key in the cache header signature does not match the key of the cache lookup operation in any of the nodes, reading, with the cache manager, a cache entry corresponding to the cache lookup operation from a data storage, and repopulating, by the cache manager, the cache entry into the expected location, when the key in the cache header signature matches the key of the cache lookup operation, acquiring, by the cache manager, an entry lock, and determining, by the cache manager, whether the key in the cache header signature still matches the key of the cache lookup operation after acquiring the entry lock, when the key in the cache header signature still matches the key of the cache lookup operation after acquiring the entry lock, finding, by the cache manager, the object data in the expected location, and when the key in the cache header signature no longer matches the key of the cache lookup operation after acquiring the entry lock, releasing, with the cache manager, the entry lock, and again walking, with the cache manager, the collision chain.

The computer code, when executed by the processor, may further implement the method of contention-free lookup by returning, by the cache manager, the object data to a caller that requested the cache lookup operation while maintaining the entry lock after finding, by the cache manager, the object data in the expected location.

Mapping the key of the cache lookup operation may include determining, by the cache manager, a hash table ID and a bucket ID of a hash bucket in a hash table in the data cache, the hash bucket corresponding to the expected location.

The cache lookup operation may include a metadata object lookup operation.

The computer code, when executed by the processor, may further implement the method of contention-free lookup by generating, by the cache manager, the cache header signature, and placing, by the cache manager, the cache header signature into a cache header of the cache entry.

The entry lock may include a shared entry lock or an exclusive entry lock, and corresponds to a mode requested by an IO operation initiated by a caller that requested the cache lookup operation.

Accordingly, the object store mechanisms of embodiments of the present disclosure enable a relatively large number of I/O threads to concurrently perform cache operations in a contention-free manner to thereby improve performance.

BRIEF DESCRIPTION OF THE DRAWINGS

The abovementioned and/or other aspects will become apparent and more readily appreciated from the following description of the embodiments, taken in conjunction with the accompanying drawings, in which.

DETAILED DESCRIPTION

Figure 1:
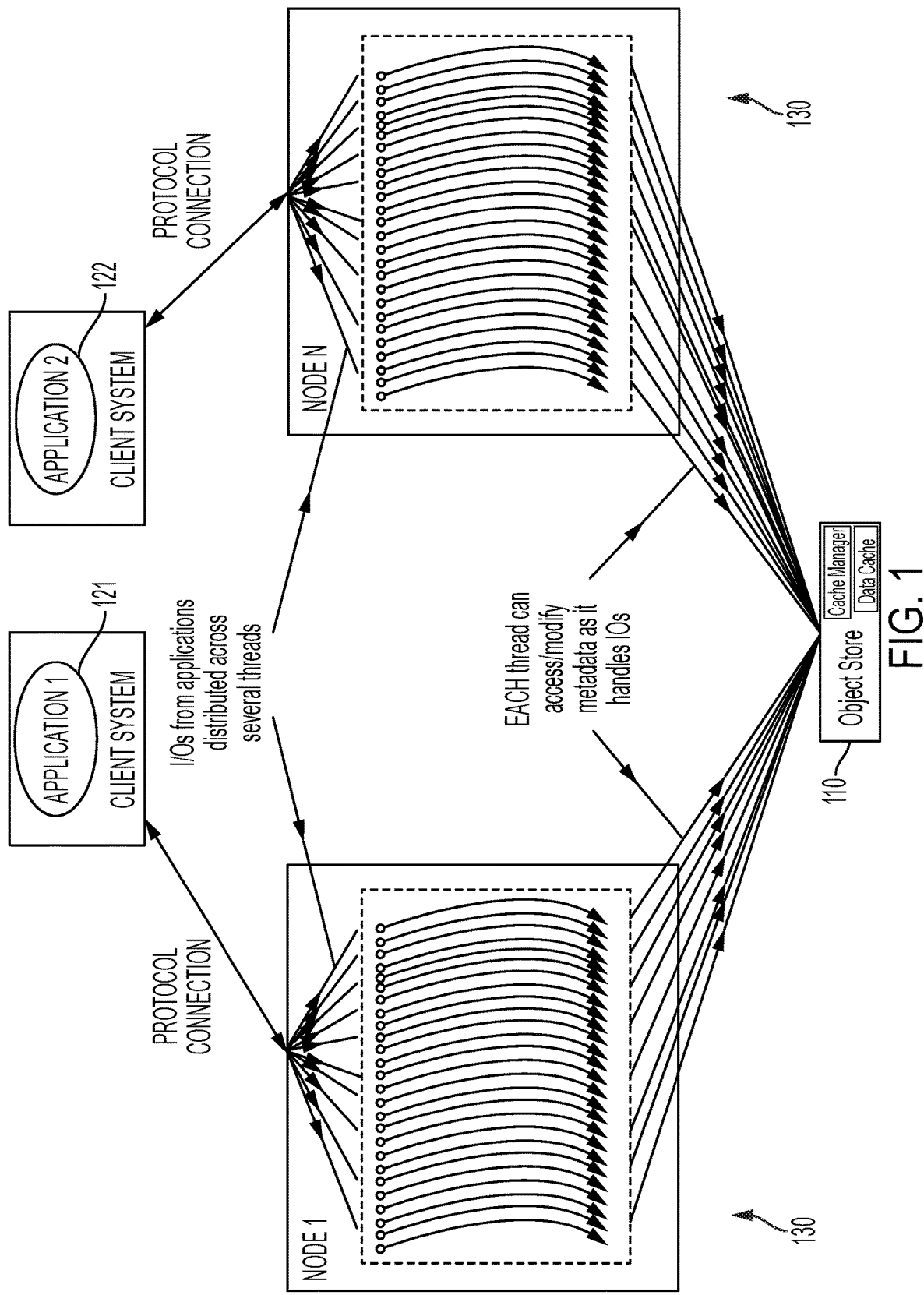
FIG. 1 depicts an object store that is configured to be accessed by multiple I/O threads respectively corresponding to different applications run by respective clients.

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

As demonstrated above, performance of a scalable, distributed object store depends upon the performance associated with accessing the metadata representing the objects stored in the object store.

Scalable storage solutions employ a massive number of I/O threads to achieve performance. However, performance can only be achieved if the I/O threads can run as concurrently as possible, and with relatively little contention between them. Such concurrency is generally achieved by the Object Store I/O stack being performant in allowing the access of the object metadata.

Conventional solutions may achieve increased performance by simply caching frequently accessed metadata, as accessing the cache is generally significantly faster than accessing memory. However, as described above, the nature of the object store metadata for modern data scalability generally uses multiple accesses to different metadata, as well as multiple accesses to the same metadata, to access corresponding object data. That is, the object store will be massively multi-threaded due to parallelism. Because a large number of objects may be accessed by multiple clients, performance of the object store is limited by the concurrency of the cache operations as the cache introduces its own synchronization primitives to maintain the cache.

Conventionally, because the I/O threads concurrently have access to the cache, the different I/O threads may concurrently perform a respective lookup operation, cache entry insertion operation, or a cache entry eviction operation, lookup operations being the most common. To avoid contention between competing operations by respective I/O threads, one of the I/O threads (e.g., a first-in-time I/O thread) may acquire a "list lock" on a list of interest prior to beginning a cache lookup operation to allow the I/O thread to walk the list in search for the node that the I/O thread is looking up without the cache entry being changed (e.g., evicted or moved) by another I/O thread. However, because all other I/O threads are unable to perform an operation on the list that has the corresponding list lock, performance of the object store may suffer, as the other I/O threads may have to wait until the list lock is released.

Embodiments of the present disclosure provide an object store that is capable of high performance by enabling the caching of frequently accessed metadata, and also provide a method of operating the object store. Further, embodiments of the present disclosure enable a high-performing cache by supporting a contention-free lookup of the cache.

A method of contention-free lookup, according to embodiments of the present disclosure, enables a massive number of I/O threads to perform concurrent cache lookups. Metadata cache lookups may be performed more than once for each I/O in the object stack. Accordingly, eliminating contention from the cache lookup operation allows performance of the object store I/O stack to scale linearly with the number of I/O threads in the I/O path. A mechanism of achieving contention-free lookup according to embodiments of the present disclosure is described below.

Figure 2:
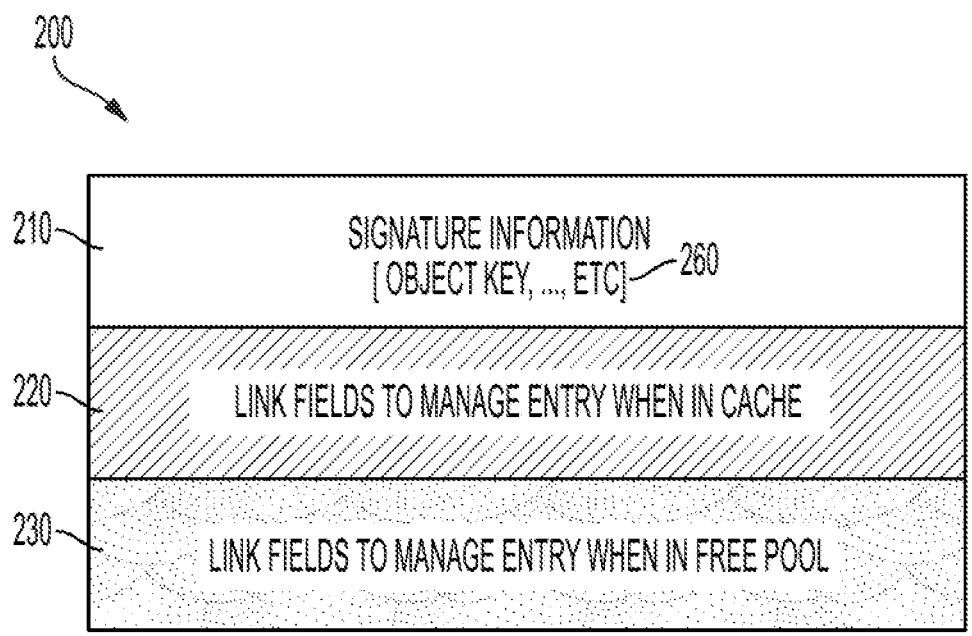
FIG. 2 depicts a structure of a cache header of a cache entry that enables contention-free lookup, according to one or more embodiments of the present disclosure.

FIG. 2 depicts a structure of a cache header of a cache entry that enables contention-free lookup, according to one or more embodiments of the present disclosure.

As described further below, cache entries are preallocated, and may be kept in a free pool, which may be separate from the cache. A cache entry may be removed from the free pool to be inserted into the cache when a new metadata object is cached. Similarly a cache entry in the cache may be removed from the cache and may be placed in the free pool when the cached metadata is evicted.

Referring to FIG. 2, a cache entry includes two parts—a cache header 200, and cached data.

The cached data generally includes the actual metadata that is cached in the cache entry. The metadata is what the individual I/O threads (e.g., the I/O threads 130 shown in FIG. 1) seek in a cache operation (e.g., in a lookup operation).

The cache header 200 generally includes various fields for managing the cache entry, or the cached data, contained in the cache. The contents of the cache header 200 are owned and managed by a cache manager. The fields included in the cache header 200 are defined by an implementation chosen for the cache (e.g., whether the implementation corresponds to a hash table, to a search tree, etc.). In the present embodiment, the cache is implemented by using a hash table structure, which will be described further below to illustrate mechanisms of a contention-free lookup method according to one or more embodiments of the present disclosure.

The cache header 200 also includes the following set of information—signature information 210, link fields for inserting the cache entry in the cache (e.g., link fields 220), and link fields for tracking the cache entry in the free pool (e.g., link fields 230).

The signature information 210 of the cache header 200 indicates the state of the cache, which specifies whether the cache entry is in the free pool or is in the cache. The signature information 210 is generally updated before a cache entry is inserted into the cache, and before a cache entry is evicted from the cache (e.g., to be placed in the free pool).

For example, the signature information 210 can include a bucket ID of the hash bucket in which the cache entry is currently located when the cache entry is inserted in a hash table, or can be a free pool ID if the cache entry is free. In other embodiments, the signature information 210 can be an ID of a search tree in which the cache entry is inserted.

The signature information 210 of the cache header 200 also indicates information about the data contained in the cache entry (e.g., the metadata). For example, the information can include a unique key associated with the data that is cached in the corresponding cache entry.

Aside from the signature information 210 of the cache header 200, the cache header 200 also includes link fields for inserting the cache entry into the cache (e.g., link fields 220).

These link fields 220 may be used as pointers that allow the cache entry to be part of the cache structure. For example, the link fields 220 for managing the cache entry when the cache entry is located in the cache can be raw pointers, indices, etc., which are used to link the cache entry into a hash table (or into a search tree, in other embodiments) based on the cache implementation chosen by the cache manager.

Further, these link fields 220 may generally always remain valid. For example, the link fields 220 for managing the cache entry when the cache entry is located in the cache are invalid prior to the creation of the cache entry, but remain valid once the cache entry is first used for cache metadata. Accordingly, even if the cache entry is removed from the cache as part of a process of evicting the cache entry from the cache, the pointers can continue to point to the values that are set when the cache entry was part of the cache.

Additionally, the cache header 200 includes link fields for tracking the cache entry when it is located in the free pool (e.g., link fields 230). These link fields 230 operate as pointers that are used to keep track of the cache entry when it is located in the free pool (as opposed to being located in the cache).

Figure 3:
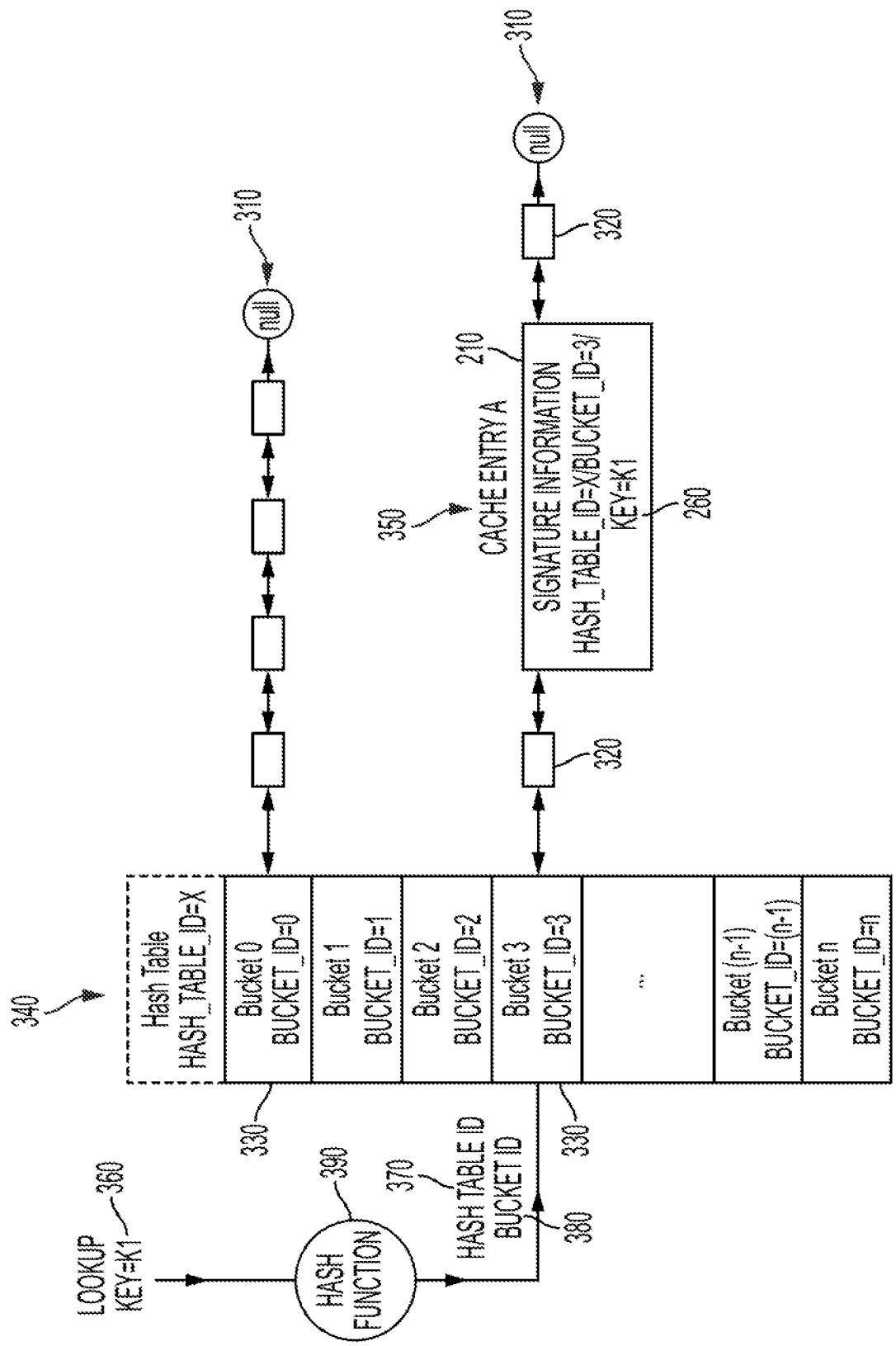
FIG. 3 depicts an example in which a cache entry is located within the cache, according to one or more embodiments of the present disclosure.
Figure 4:
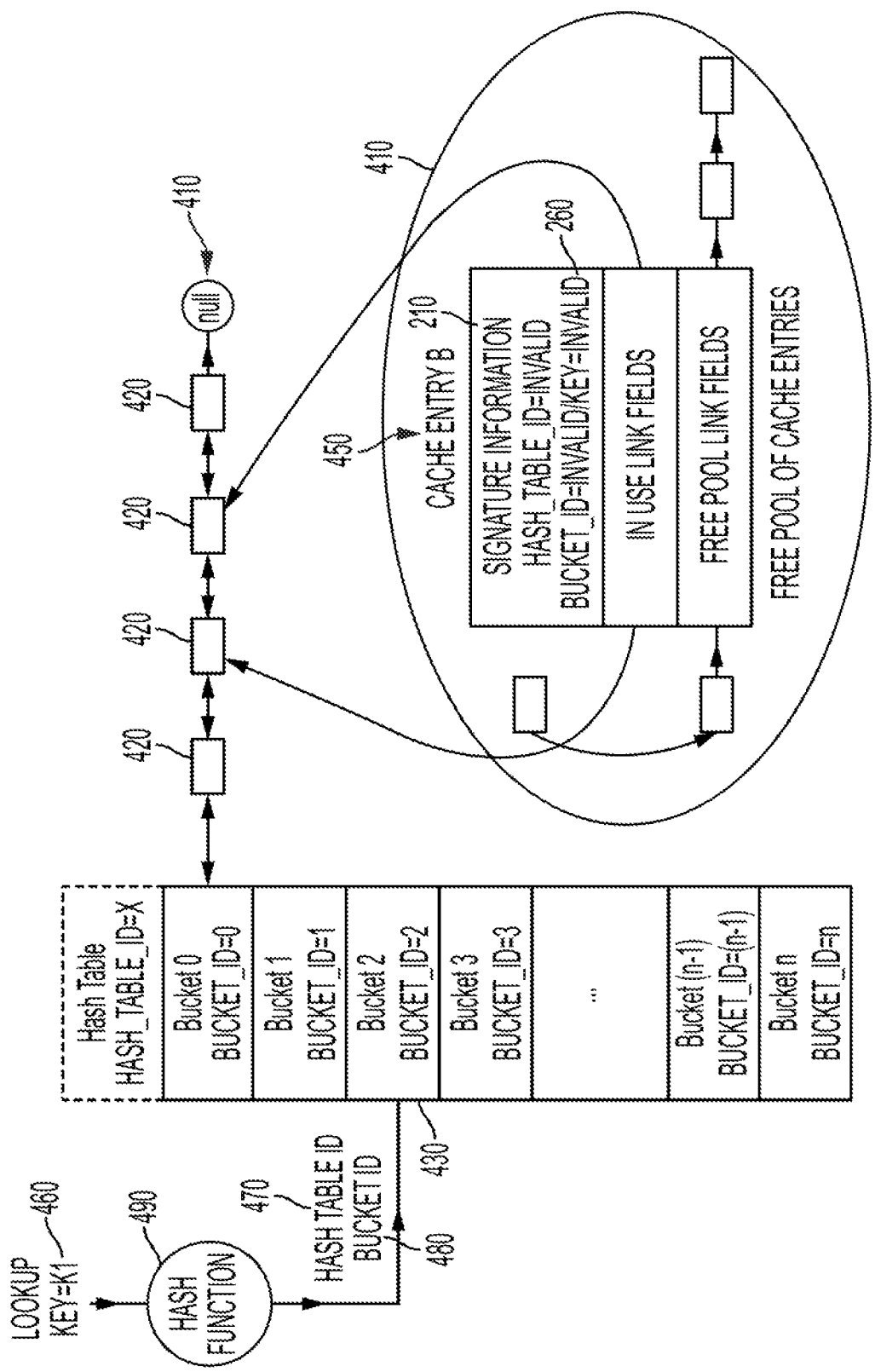
FIG. 4 depicts an example in which a cache entry is evicted from the cache and located in a free pool, according to one or more embodiments of the present disclosure.

FIG. 3 depicts an example in which a cache entry is located within the cache, according to one or more embodiments of the present disclosure. FIG. 4 depicts an example in which a cache entry is evicted from the cache and located in a free pool, according to one or more embodiments of the present disclosure.

Referring to FIGS. 3 and 4, in the example of the present embodiment, the cache implementation uses a hash table 340 to manage cache entries (e.g., "CACHE ENTRY A" 350 in FIG. 3, or "CACHE ENTRY B" 450 in FIG. 4) in the cache.

In a highly scalable and performant object store, there may be several thousands, of I/O threads (e.g., the I/O threads 130 shown in FIG. 1) that seek to perform concurrent lookups in the metadata cache (e.g., the object store 110) at any point of time.

A contention-free lookup method, according to embodiments of the present disclosure, eliminates synchronization that is otherwise required when an I/O thread walks a dynamic list 310. A dynamic list 310 is a list in which insertions and deletions of cache entries can occur concurrently with lookups of multiple respective I/O threads. The dynamic list 310 may be contained in a hash bucket 330.

Conventionally, list locks on the list 310 may be acquired by an I/O thread to allow the I/O thread to walk the list 310 in search for the node 320 it is looking up without the cache entry located in the node being moved to a different hash bucket 330 or to the free pool 410. However, acquiring a list lock during a lookup may cause contention between competing cache operations occurring on the hash bucket 330 (e.g., contention between unrelated lookup operations, cache insert operations, and/or cache eviction operations performed by respective I/O threads).

With a cache hit rate of over 90%, a lookup operation is frequently the only cache operation to be performed by an I/O thread. Thus, increasing performance of the I/O path includes scaling with the number of I/O threads. Accordingly, reducing contention in a cache lookup may be particularly useful, because a cache lookup is the most frequent operation in the cache.

Figure 5:
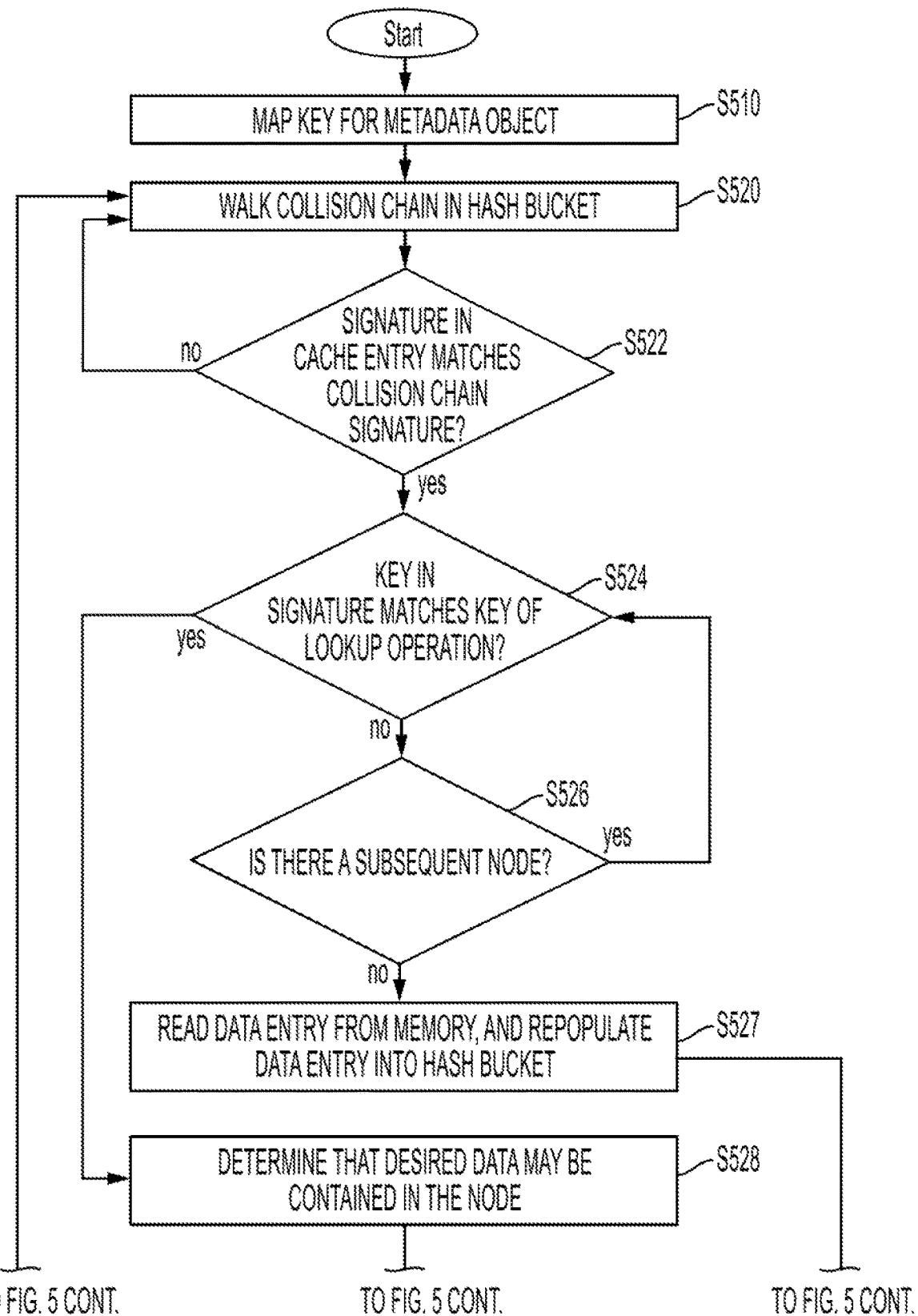
FIG. 5 depicts a flowchart of a method of a contention-free lookup, according to one or more embodiments of the present disclosure.
Figure 5:
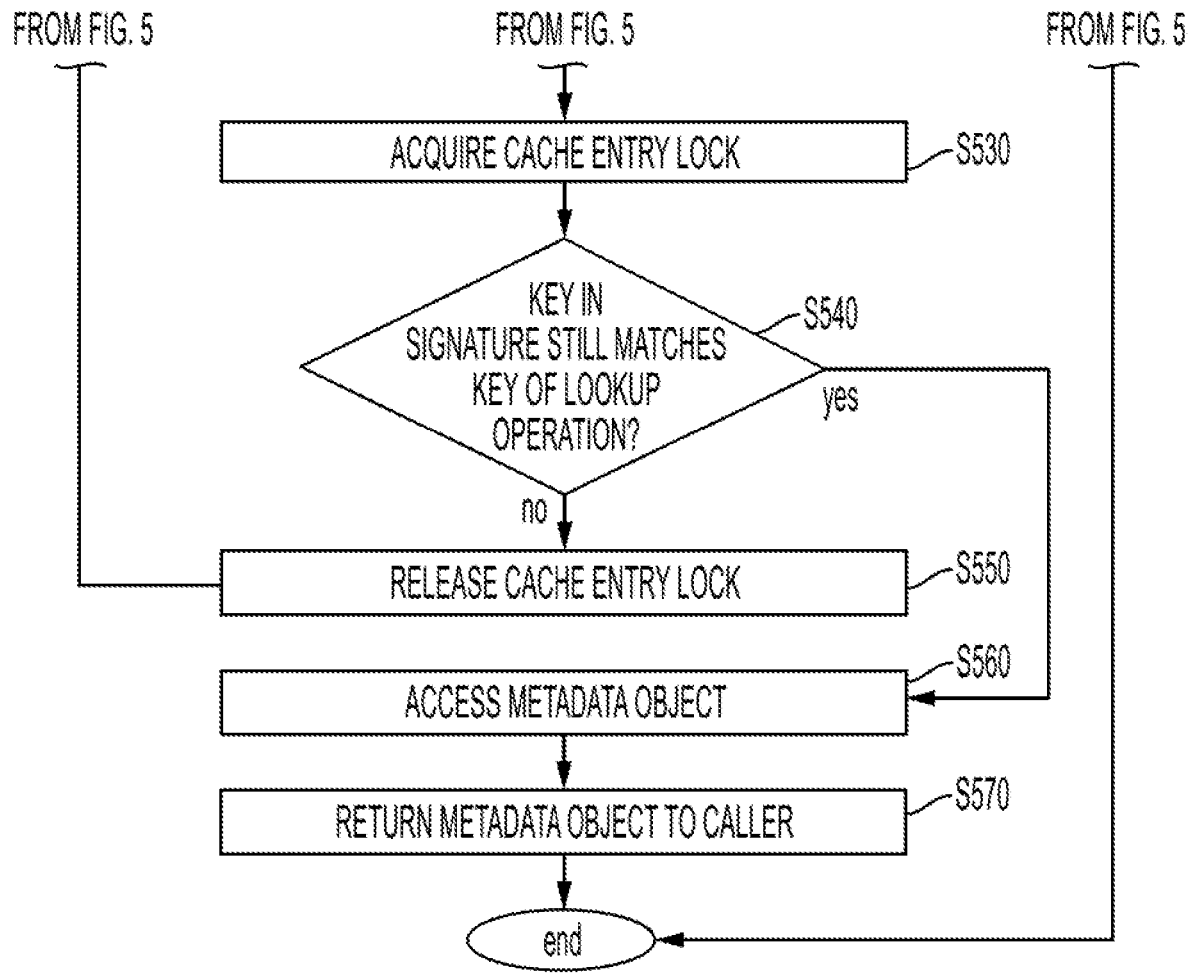

FIG. 5 depicts a flowchart of a method of a contention-free lookup, according to one or more embodiments of the present disclosure.

Referring to FIGS. 3, 4, and 5, for a lookup operation, an I/O thread may map a key 360 (e.g., KEY=K1) for an object (e.g., by using a hash function 390) into a hash table ID 370 and a bucket ID 380 in the cache (S510).

The I/O thread may then walk the collision chain 310 in the hash bucket 330 corresponding to the hash table ID 370 and the bucket ID 380 by performing the following operations for each cache entry in the list 310 (S520).

Walking the collision chain 310 may include determining whether the signature information 210 in the cache entry matches that of the collision chain signature (e.g., matches the hash table ID 370 and the bucket ID 380) (S522). If there is a mismatch with expected collision chain signature, the I/O thread may restart the walk of the collision chain 310 (e.g., go back to (S520)).

However, if there is a match between the signature information 210 in the cache entry and the collision chain signature information, the I/O thread may then determine whether the key 260 in the signature information 210 of the cache entry matches the key 360 of the lookup operation (S524). If there is no match, the I/O thread may continue to walk the collision chain 310 by moving on to the next node 320 in the collision chain 310 (S526). The I/O thread may again determine whether the key 260 in the signature information 210 matches the key 360 of the lookup operation for the subsequent node 320 (S524). If there is no subsequent node 320 in the collision chain 310, the I/O thread may read a cache entry corresponding to the data lookup operation from a data storage/memory (e.g., CACHE ENTRY B 450 from the free pool 410), and may repopulate the cache entry 450 into the hash bucket 330 corresponding to the hash table ID 370 and the bucket ID 380 determined by the hash function 390 (S527).

However, if it is determined that the key 260 in the signature information 210 of the cache entry (e.g., CACHE ENTRY A 350 of FIG. 3) matches the key 360 of the lookup operation, then the I/O thread may determine that a potential match exists (e.g., the I/O thread may determine that the data sought by the lookup operation is contained in the node 320 containing the cache entry 350) (S528).

The I/O thread may then acquire a cache entry lock on the node 320 potentially containing the sought after data (S530). Unlike conventional methods, there is no global lock placed on the cache or on the list 310 as a result of the entry lock, which comparatively reduces performance. Instead, the entry lock holds a lock on the hash bucket level such that the list 310 is not modified. The entry lock only protects the contents in the entry, and the list 310 is not required to be locked. By performing signature checking, the I/O thread is able to know that it is walking the correct list at all times, such that the I/O thread does not need a lock to protect list 310.

The entry lock is mainly to protect the data in the cache entry. This is the data that the 10 thread is interested in.

The cache entry lock may be in the mode requested by the I/O operation (e.g., may be a shared entry lock or an exclusive entry lock). Accordingly, the cache manager can prevent other I/O threads from moving, evicting, or otherwise changing the cache entry 350 before the subject lookup operation has completed.

The I/O thread may then determine whether the key 260 in the signature information 210 still matches the key 360 of the lookup operation following the cache entry lock (S540). That is, the I/O thread may seek to ensure that, between the time the I/O thread determined that a potential match exists (S528) and the time that the I/O thread acquired an entry lock on the cache entry 350 containing the potential match (S530), the cache entry 350 has not been moved (e.g., evicted to the free pool 410, or moved to a different hash bucket 330 in the cache, by another I/O thread performing a competing eviction operation on the cache entry 350).

If the I/O thread determines that the key 260 in the signature information 210 no longer matches the key 360 of the lookup operation, then the I/O thread may release the cache entry lock (S550), and may restart the walk (e.g., go back to (S520)).

However, if the I/O thread determines that the key 260 in the signature information 210 still matches the key 360 of the lookup operation, then the I/O thread has found the sought after metadata object in the cache, and may access the metadata object (S560).

Then, the I/O thread may return the metadata object to a corresponding caller while holding the cache entry lock in the appropriate mode as requested by the I/O thread (S570).

Accordingly, the disclosed embodiments provide improvements to the field of data storage by providing a distributed object store capable of servicing a large number of I/O threads while providing a contention-free lookup mechanism.

In the description, for the purposes of explanation, numerous specific details provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or I/O thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise for example indicated. Accordingly, it will be understood by those of skill in the art that various changes in form and details may be made without departing from the spirit and scope of the present disclosure as set forth in the following claims, with functional equivalents thereof to be included therein.

What is claimed is:

1. A method of contention-free lookup by a cache manager of a data cache, the method comprising:
   mapping, with the cache manager, a key of a cache lookup operation by performing a hash function on the key to determine an expected location, in the data cache, of object data corresponding to a key;
   walking, by the cache manager, a collision chain of the expected location by determining, with the cache manager, for up to each node of a plurality of nodes of the collision chain, that a cache header signature matches or is different from a collision chain signature of the collision chain, the cache header signature comprising information indicating a state of a cache entry and a state of the object data in the cache entry;
   based on determining that the cache header signature is different from the collision chain signature, again walking, with the cache manager, the collision chain;
   based on determining that the cache header signature matches the collision chain signature, determining, with the cache manager, for up to each of the nodes, that a key in the cache header signature matches or is different from the key of the cache lookup operation;
   based on determining that the key in the cache header signature is different from the key of the cache lookup operation in each of the nodes, reading, with the cache manager, a cache entry corresponding to the cache lookup operation from a data storage, and repopulating, by the cache manager, the cache entry into the expected location based on the cache header signature information;
   based on determining that the key in the cache header signature matches the key of the cache lookup operation, acquiring, by the cache manager, an entry lock for holding a lock on a cache entry to protect only contents in the cache entry while a remainder of the collision chain is unlocked, and determining, by the cache manager, that the key in the cache header signature still matches or no longer matches the key of the cache lookup operation after acquiring the entry lock;
      based on determining that the key in the cache header signature still matches the key of the cache lookup operation after acquiring the entry lock, finding, by the cache manager, the object data in the expected location; and
      based on determining that the key in the cache header signature no longer matches the key of the cache lookup operation after acquiring the entry lock, releasing, with the cache manager, the entry lock, and again walking, with the cache manager, the collision chain.

2. The method of claim 1, further comprising returning, by the cache manager, the object data to a caller that requested the cache lookup operation while maintaining the entry lock after finding, by the cache manager, the object data in the expected location.

3. The method of claim 1, wherein mapping the key of the cache lookup operation comprises determining, by the cache manager, a hash table ID and a bucket ID of a hash bucket in a hash table in the data cache, the hash bucket corresponding to the expected location.

4. The method of claim 1, wherein the cache lookup operation comprises a metadata object lookup operation.

5. The method of claim 1, further comprising generating, by the cache manager, the cache header signature, and placing, by the cache manager, the cache header signature into a cache header of the cache entry.

6. The method of claim 1, wherein the entry lock comprises a shared entry lock or an exclusive entry lock, and corresponds to a mode requested by an IO operation initiated by a caller that requested the cache lookup operation.

7. An object store facilitating contention-free lookup operations by a plurality of threads, the object store comprising a data cache that is managed by a cache manager, and a processor that is configured to implement a method of contention-free lookup by the cache manager, wherein the cache manager:
   maps a key of a cache lookup operation by performing a hash function on the key to determine an expected location, in the data cache, of object data corresponding to a key;
   walks a collision chain of the expected location by determining, with the cache manager, for up to each node of a plurality of nodes of the collision chain, that a cache header signature matches or is different from a collision chain signature of the collision chain, the cache header signature comprising information indicating a state of a cache entry and a state of the object data in the cache entry;
   based on determining that the cache header signature is different from the collision chain signature, again walks the collision chain;
   based on determining that the cache header signature matches the collision chain signature, determines, for up to each of the nodes, that a key in the cache header signature matches or is different from the key of the cache lookup operation;
   based on determining that the key in the cache header signature is different from the key of the cache lookup operation in each of the nodes, reads a cache entry corresponding to the cache lookup operation from a data storage, and repopulates the cache entry into the expected location based on the cache header signature information;
   based on determining that the key in the cache header signature matches the key of the cache lookup operation, acquires an entry lock for holding a lock on a cache entry to protect only contents in the cache entry while a remainder of the collision chain is unlocked, and determines that the key in the cache header signature still matches or no longer matches the key of the cache lookup operation after acquiring the entry lock;
      based on determining that the key in the cache header signature still matches the key of the cache lookup operation after acquiring the entry lock, finds the object data in the expected location; and
      based on determining that the key in the cache header signature no longer matches the key of the cache lookup operation after acquiring the entry lock, releases the entry lock, and again walks the collision chain.

8. The object store of claim 7, wherein the cache manager returns the object data to a caller that requested the cache lookup operation while maintaining the entry lock after finding the object data in the expected location.

9. The object store of claim 7, wherein the cache manager maps the key of the cache lookup operation by determining a hash table ID and a bucket ID of a hash bucket in a hash table in the data cache, the hash bucket corresponding to the expected location.

10. The object store of claim 7, wherein the cache lookup operation comprises a metadata object lookup operation.

11. The object store of claim 7, wherein the cache manager generates the cache header signature, and places the cache header signature into a cache header of the cache entry.

12. The object store of claim 7, wherein the entry lock comprises a shared entry lock or an exclusive entry lock, and corresponds to a mode requested by an IO operation initiated by a caller that requested the cache lookup operation.

13. The object store of claim 7, wherein the cache header signature contains information indicating a state of a cache entry and a state of the object data in the cache entry.

14. A non-transitory computer readable medium implemented on a distributed object store system, the non-transitory computer readable medium having computer code for execution on a processor that implements a method of contention-free lookup by a cache manager of a data cache of the distributed object store system, the method comprising:
  mapping, with the cache manager, a key of a cache lookup operation by performing a hash function on the key to determine an expected location, in the data cache, of object data corresponding to a key;
  walking, by the cache manager, a collision chain of the expected location by determining, with the cache manager, for up to each node of a plurality of nodes of the collision chain, that a cache header signature matches or is different from a collision chain signature of the collision chain, the cache header signature comprising information indicating a state of a cache entry and a state of the object data in the cache entry;
    based on determining that the cache header signature is different from the collision chain signature, again walking, with the cache manager, the collision chain;
    based on determining that the cache header signature matches the collision chain signature, determining, with the cache manager, for up to each of the nodes, that a key in the cache header signature matches or is different from the key of the cache lookup operation;
      based on determining that the key in the cache header signature is different from the key of the cache lookup operation in each of the nodes, reading, with the cache manager, a cache entry corresponding to the cache lookup operation from a data storage, and repopulating, by the cache manager, the cache entry into the expected location based on the cache header signature information;
      based on determining that the key in the cache header signature matches the key of the cache lookup operation, acquiring, by the cache manager, an entry lock for holding a lock on a cache entry to protect only contents in the cache entry while a remainder of the collision chain is unlocked, and determining, by the cache manager, that the key in the cache header signature still matches or no longer matches the key of the cache lookup operation after acquiring the entry lock;
        based on determining that the key in the cache header signature still matches the key of the cache lookup operation after acquiring the entry lock, finding, by the cache manager, the object data in the expected location; and
        based on determining that the key in the cache header signature no longer matches the key of the cache lookup operation after acquiring the entry lock, releasing, with the cache manager, the entry lock, and again walking, with the cache manager, the collision chain.

15. The non-transitory computer readable medium of claim 14, wherein the computer code further implements the method of contention-free lookup by returning, by the cache manager, the object data to a caller that requested the cache lookup operation while maintaining the entry lock after finding, by the cache manager, the object data in the expected location.

16. The non-transitory computer readable medium of claim 14, wherein mapping the key of the cache lookup operation comprises determining, by the cache manager, a hash table ID and a bucket ID of a hash bucket in a hash table in the data cache, the hash bucket corresponding to the expected location.

17. The non-transitory computer readable medium of claim 14, wherein the cache lookup operation comprises a metadata object lookup operation.

18. The non-transitory computer readable medium of claim 14, wherein the computer code further implements the method of contention-free lookup by generating, by the cache manager, the cache header signature, and placing, by the cache manager, the cache header signature into a cache header of the cache entry.

19. The non-transitory computer readable medium of claim 14, wherein the entry lock comprises a shared entry lock or an exclusive entry lock, and corresponds to a mode requested by an IO operation initiated by a caller that requested the cache lookup operation.

* * * * *